Sept. 28, 1965    J. DUFFALA    3,208,623
GLAD HAND COVER

Filed Sept. 25, 1963    2 Sheets-Sheet 1

INVENTOR
JOSEPH DUFFALA
BY *Scrivener & Parker*
ATTORNEYS

Sept. 28, 1965   J. DUFFALA   3,208,623
GLAD HAND COVER

Filed Sept. 25, 1963   2 Sheets-Sheet 2

INVENTOR
JOSEPH DUFFALA

BY  *Scrivener + Parker*
ATTORNEYS

United States Patent Office 3,208,623
Patented Sept. 28, 1965

3,208,623
GLAD HAND COVER
Joseph Duffala, Elyria, Ohio, assignor to Bendix-Westinghouse Automotive Air Brake Company, Elyria, Ohio, a corporation of Delaware
Filed Sept. 25, 1963, Ser. No. 311,384
7 Claims. (Cl. 220—35)

This invention relates to hose couplings known in the art as "glad hands" are more particularly to an improved cover for such couplings which serves to prevent the entrance of dirt, water, etc. into the coupling opening.

In automotive tractor-trailer air brake systems glad hand couplings are utilized to inter-connect the tractor and trailer pressure conduits. When a trailer is disconnected from a tractor the tractor couplings are usually connected to a blind or dummy coupling member fixed to the rear of the tractor whereas the trailer couplings are usually merely hung on a convenient bracket fully exposed to dirt, water and debris which could be carried into the valves and other braking components on the trailer resulting in possible dangerous failure of such components.

The broad object of the present invention is to provide a permanently attached unitary cover member for glad hand couplings, particularly for trailer glad hands, which is simple and economical in construction yet reliably and automatically covers the opening of a disconnected glad hand while not impeding the ready connection of the glad hand with a mating glad hand.

Other objects and their attendant advantages will become apparent as the following detailed description is read in conjunction with the accompanying drawings wherein.

Figure 1:
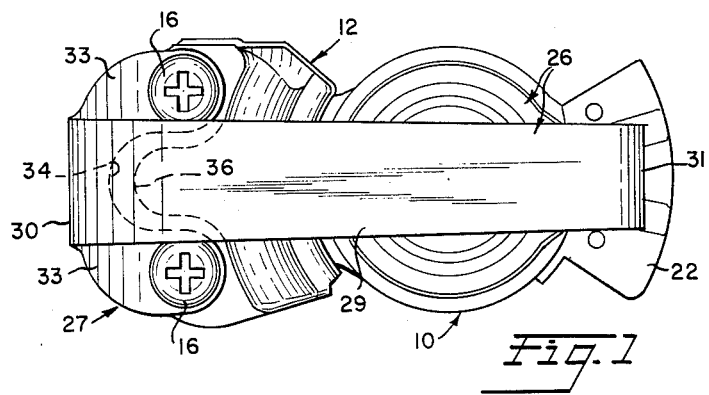
FIG. 1 is a top plan view of a glad hand coupling employing the cover of the present invention.

Referring now to the drawings, the numeral 10 designates a glad hand coupling which may be of the type shown in the patent to Stoudt, No. 3,052,489. The patented coupling, while being fully compatible with conventional couplings, differs in that the overhanging lock arm 12 is formed as a separable member of springy sheet material which is connected to the main body 14 of the coupling by a pair of laterally spaced machine screws 16 as shown in the drawing. For a detailed description of the precise construction of the lock arm 12 and its manner of attachment to the coupling body, reference is made to the aforementioned patent. As is usual the glad hand 10 is provided with a central vertical opening 18 which is surrounded by a gasket 20 of rubbery material as clearly shown in FIG. 2 and is also provided with a forward extension 22 carrying on its underside a lock rib 24 which is adapted to be engaged beneath the lock arm of a mating coupling as is well recognized in the art.

The present invention is concerned with improved means for automatically closing off the central opening 18 when the coupling is disconnected from a mating coupling. In accordance with the invention, the cover member, broadly designated by the numeral 26, comprises a unitary member of highly springy sheet material which in its initial condition prior to attachment to the coupling partakes generally of the form indicated by the phantom line 26 in FIG. 2 so that when the cover is in its position of use it is inherently biased, or can be said to be pre-stressed, in the direction of the opening 18 of the coupling so as to form a substantially dirt and water-proof seal with the gasket 20 of the glad hand. That is to say, before installation the cover member is somewhat C-shaped with two inwardly extending parts 27, 28 connected to the opposite ends of an elongated central part 29 by a pair of arcuate end parts 30, 31 which space the inwardly extending parts away from one side of the central part 29 whereby the latter extends over the lock arm 12. The inwardly extending part 27 includes means for attaching the cover member to the body of the glad hand on the inner side of the opening 18 rearwardly of the lock arm, and at the inner end of the other inwardly extending part is a cover part, generally indicated by the numeral 32, for covering the glad hand opening 18. As can be seen by the phantom lines in FIG. 2 the plane of the cover part 32 is normally below the plane of the first inwardly extending part 27 and may be angularly related with respect thereto so that when installed, the cover part is biased against the glad hand opening as previously mentioned.

From one aspect, the aforementioned angular relationship can be achieved by initially forming the left hand arcuate part 30 so that it encompasses an arc sufficiently greater than 180° so that the cover part would tend in its unstressed condition to occupy a position substantially below the gasket 20 and to slope inwardly and upwardly with respect thereto so that when sprung over the gasket after installation, sealing pressure on the gasket is substantially uniform about its entire periphery.

From another aspect, the cover member can be considered as comprising spaced front and rear parts 27, 28 extending towards each other with their respective rear and forward ends being interconnected by a re-curving leaf type spring composed of the arcuate parts 30, 31 and a straight part 29. The front part includes the cover part 32 and the rear part 27 includes means for attaching the cover member to the body of the coupling. The recurring spring can be said to be pre-stressed so that the front part is normally sufficiently below the rear part that the cover part must be sprung upwardly to sealingly engage the opening gasket 20.

Because the cover member shown is particularly adapted for use with the coupling shown and described in the aforementioned patent to Stoudt (though the invention is by no means limited to use with such couplings) the first inwardly extending part 27 is formed as a pair of laterally spaced flanges 33 separated by a cut out portion 34 adapted to accommodate an upstanding structural part 36 (see FIG. 2) of the lock arm member 12. The forward ends of each of the laterally spaced flanges are apertured to receive the machine screws 16 which also serve to retain the locked arm 12 in its position of use. The arcuate end part 3 fairs into a downwardly and inwardly sloping straight part 38 and attached to the end of this in angular relationship thereto is the cover part 32.

Figure 2:
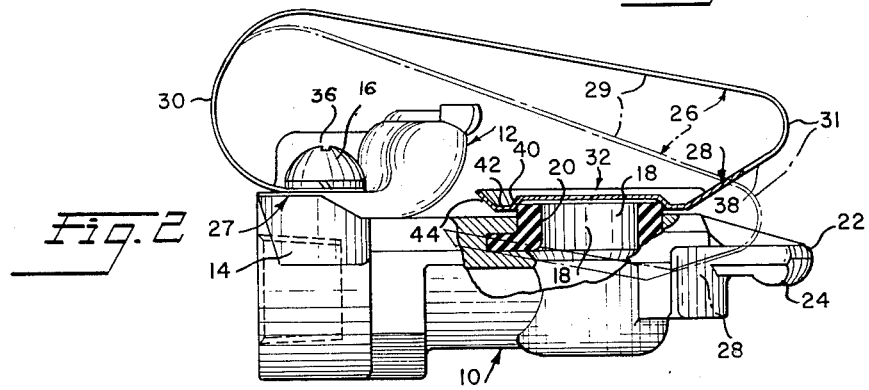
FIG. 2 is a side elevation, partly in section, of the coupling and cover of FIG. 1.
Figure 3:
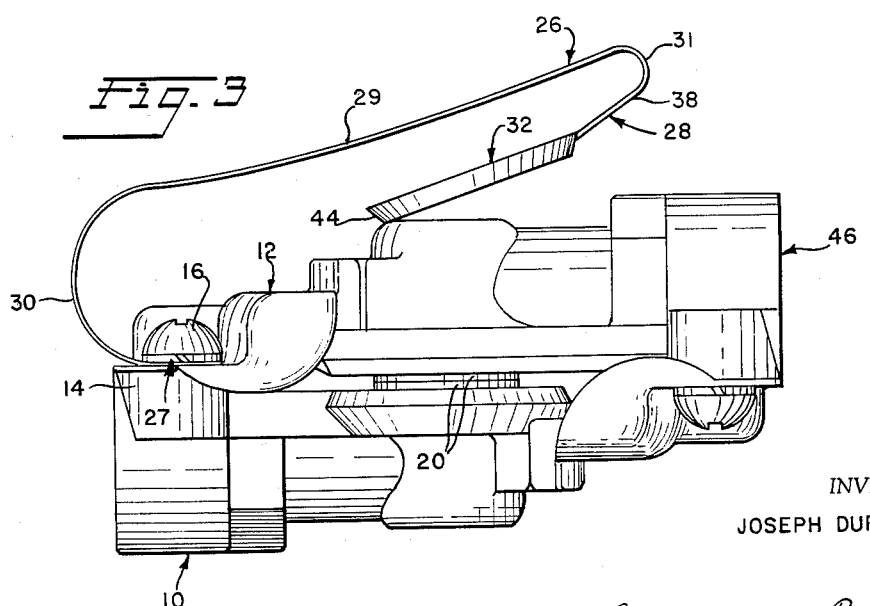
FIG. 3 is a side elevation of a pair of connected couplings, one of which is equipped with the cover of the invention.

The cover part illustrated in FIGS. 1 through 3 comprises a circular, shallow inverted dish-like member having an outwardly and downwardly sloping side wall 40 whose inner surface is adapted to sealingly engage the outer annular edge of the coupling gasket 20. Integral with the lower edge of the side wall 40 is an annular flange 42 the marginal edge of which has integral therewith an upwardly and outwardly sloping skirt part 44. The parts 42, 44 serve as strengthening members and the outwardly flaring skirt part 44 also serves as a cam or guide whereby the cover is readily sprung clear of the opening by parts of a second coupling as it is moved in to connecting relations with the coupling carrying the cover member.

Figure 4:
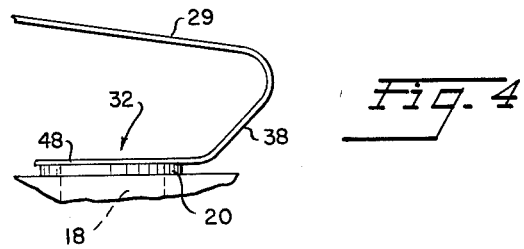
FIGS. 4 through 7 illustrate various forms of which the cover member may partake.
Figure 5:
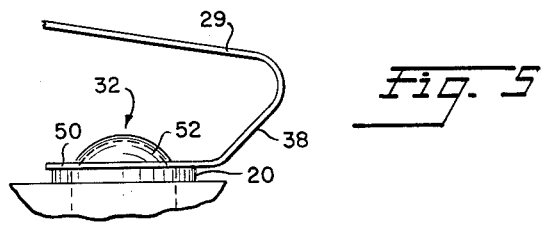
Figure 6:
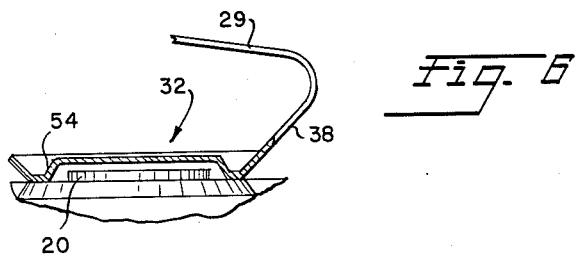
Figure 7:
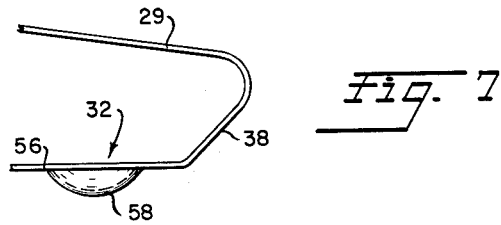

FIGS. 4 through 7 illustrate various modifications which the cover part may partake. In FIG. 4 the cover part 32 is merely a flat plate 48 which engages the upper annular edge of the sealing gasket 20. In FIG. 5, the cover part is shown as a stamping which includes an annular flange 50 surrounding an upwardly extending, part-spherical central part 52 which serves to give additional rigidity to the cover part. The cover part shown in FIG. 6 is substantially identical to that disclosed in FIGS. 1 through 3 except that its diameter is somewhat larger and the side wall 54 has a greater depth than the side wall 40 so that the cover extends above and beyond the gasket to engage the coupling body around the gasket. The embodiment of FIG. 7 includes an annular flange 56 surrounding a downwardly extending part spherical part 58 which is adapted to nest within the opening of the coupling.

When the coupling with the cover member of the invention is to be connected to a mating coupling, the forward extension of the latter is moved against the downwardly and inwardly sloping straight part 38 of the cover so that the entire cover member is cammed upwardly to approximately the position shown in FIG. 3. Once the cover member is clear of the path of movement of the mating coupling the openings of the respective couplings are adjusted so as to be in approximate axial alignment and the couplings are twisted together in the normal manner into the fully connected condition of FIG. 3 with the cover part 32 of the cover member riding on top of the mating coupling and offering no interference to the normal coupling movement of the glad hands. When the couplings are to be disconnected they are merely twisted in an uncoupling direction and as soon as the mating coupling is withdrawn the cover member snaps downwardly over the opening in the coupling as in FIG. 2.

Though the cover member of the invention has been described in connection with its use on a coupling of the type shown in the aforementioned patent to Stoudt, it will be apparent that the flange parts 33 could be suitably modified for attachment to the rear part of a conventional unitary cast coupling without departing in any way from the scope of the invention. It will also be apparent to those skilled in the art that the cover members described herein are representative of preferred embodiments of the invention and are susceptible of a variety of changes and modifications without departing from the scope and spirit of the appended claims.

What is claimed is:

1. A cover member for the opening of a glad hand coupling comprising a unitary C-shaped structure of highly springy sheet material and including a pair of opposed inwardly extending parts, an elongated central part and a pair of arcuate end parts inter-connecting the ends of said elongated part with the respective inwardly extending parts, one of said inwardly extending parts including means for connecting said cover member to the body of a glad hand coupling, and a cover part for the opening of said coupling at the inner end of the other inwardly extending part, said structure being pre-stressed whereby said cover part is adapted to be resiliently biased against said opening when said one inwardly extending part is connected to the body of a glad hand coupling.

2. The cover member of claim 1 wherein a normally straight part is interposed between said cover part and its adjacent arcuate part to serve as a camming service for a mating coupling.

3. A cover member for the opening of a conventional glad hand coupling comprising a unitary generally C-shaped member of springy material and including a pair of opposed inwardly extending spaced-apart parts, an elongated central part spaced above said spaced-apart parts, and a pair of end parts respectively interconnecting the outer ends of said central part with the outer ends of said spaced-apart parts, each of said end parts being bent downwardly from the ends of said central part and then inwardly toward said spaced-apart parts, means carried by one of said spaced-apart parts for connecting the same to the body of a glad hand coupling, and a cover part for the opening of said coupling formed adjacent the inner end of the other of said spaced-apart parts, said member being pre-stressed whereby said cover part is adapted to be resiliently biased against said opening when said one part is connected to the body of a glad hand coupling.

4. The cover member of claim 3 wherein said cover part comprises a flat circular plate, a downwardly flared skirt surrounding said plate, an annular radial flange at the lower end of said skirt, and an upwardly and outwardly flaring skirt marginally surrounding said flange.

5. The cover member of claim 3 wherein said spring includes an integral forward camming part adapted to be engaged by the forward end of a second coupling to cam said cover part and said spring away from said opening when said second coupling is to be connected to a coupling carrying said cover member.

6. The cover member of claim 3 wherein said cover part comprises a flat plate.

7. The cover member of claim 3 wherein said cover part includes a central, part-spherical part and an annular flange surrounding said part.

References Cited by the Examiner

UNITED STATES PATENTS

| 428,343 | 5/90 | Lambert. | |
| 2,733,829 | 2/56 | Lewit | 220—35 |

FOREIGN PATENTS 207,455 11/23 Great Britain.

THERON E. CONDON, *Primary Examiner.*